Aug. 28, 1962 R. E. STEINMUELLER ET AL 3,050,992
UNIVERSAL STRENGTH TESTING MACHINE
Filed Feb. 24, 1959 7 Sheets-Sheet 3

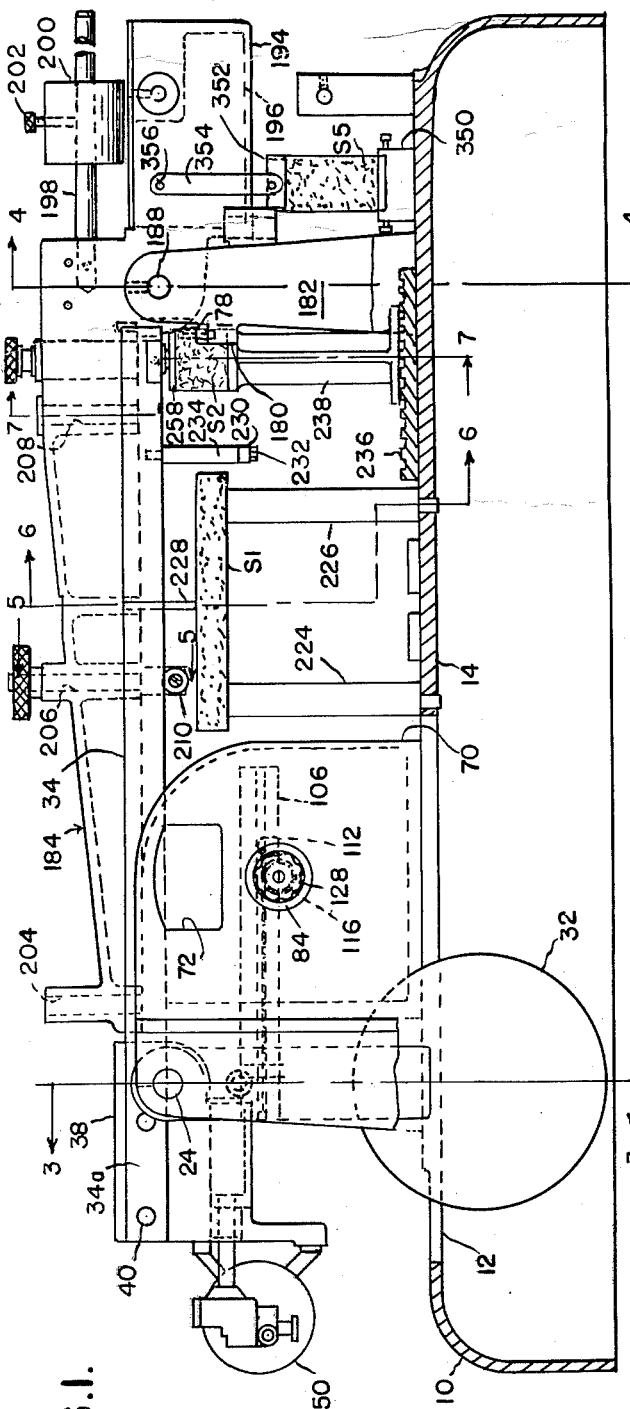

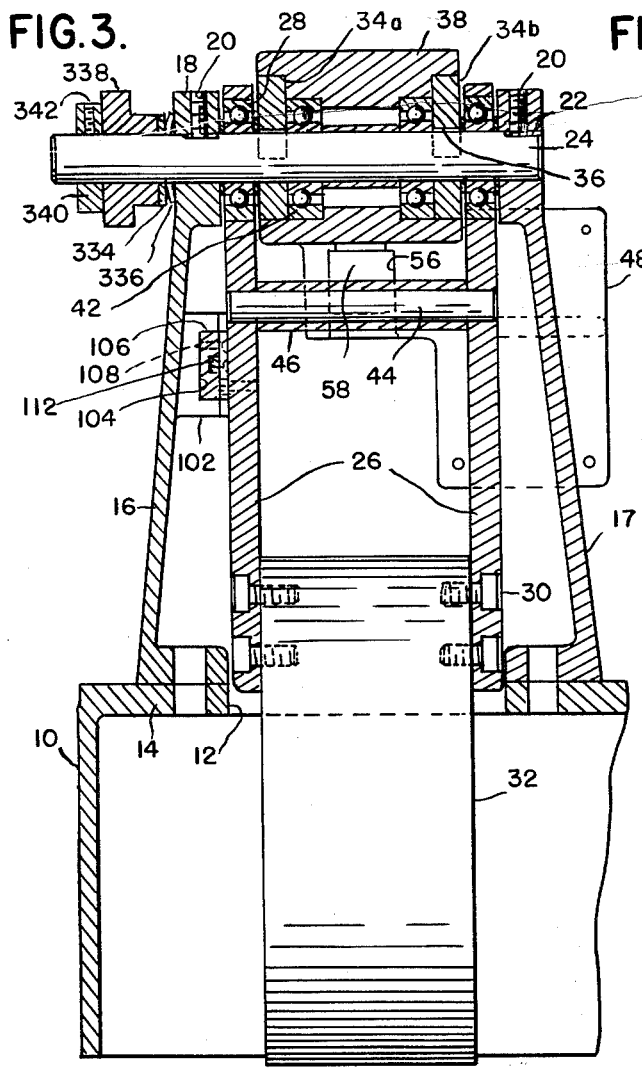
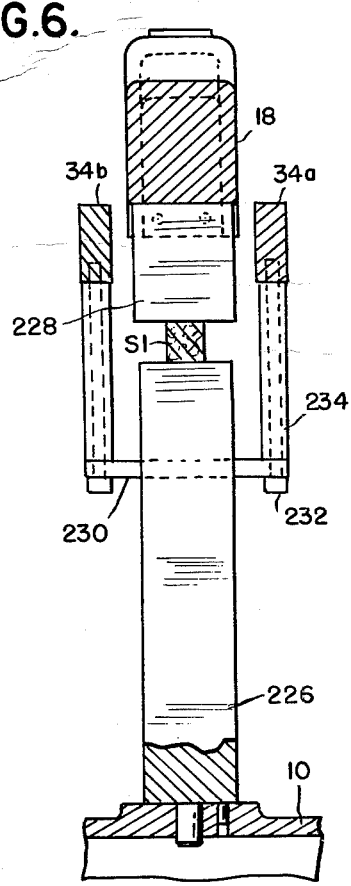

*INVENTORS*
RALPH E. STEINMUELLER
VICTOR M. ROWELL
BY
*Whittemore, Hulbert*
*& Belknap* ATTORNEYS Aug. 28, 1962 R. E. STEINMUELLER ET AL 3,050,992
UNIVERSAL STRENGTH TESTING MACHINE
Filed Feb. 24, 1959 7 Sheets-Sheet 4
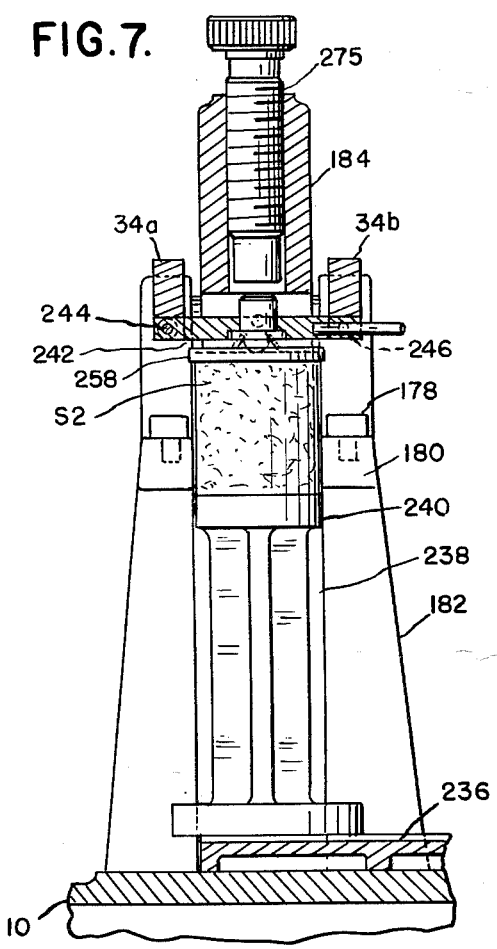
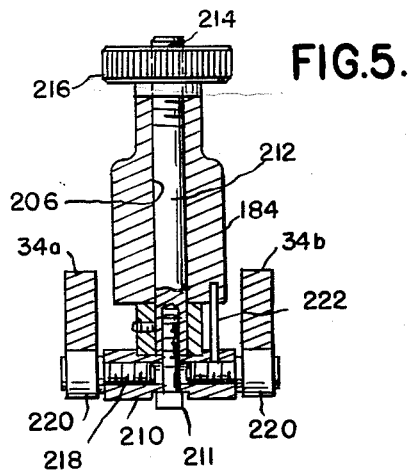
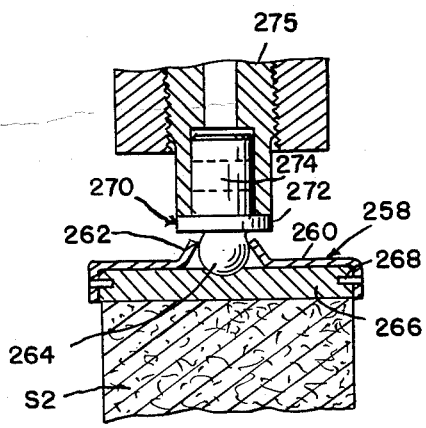
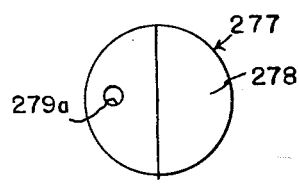
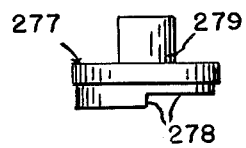
INVENTORS
RALPH E. STEINMUELLER
BY VICTOR M. ROWELL
ATTORNEYS

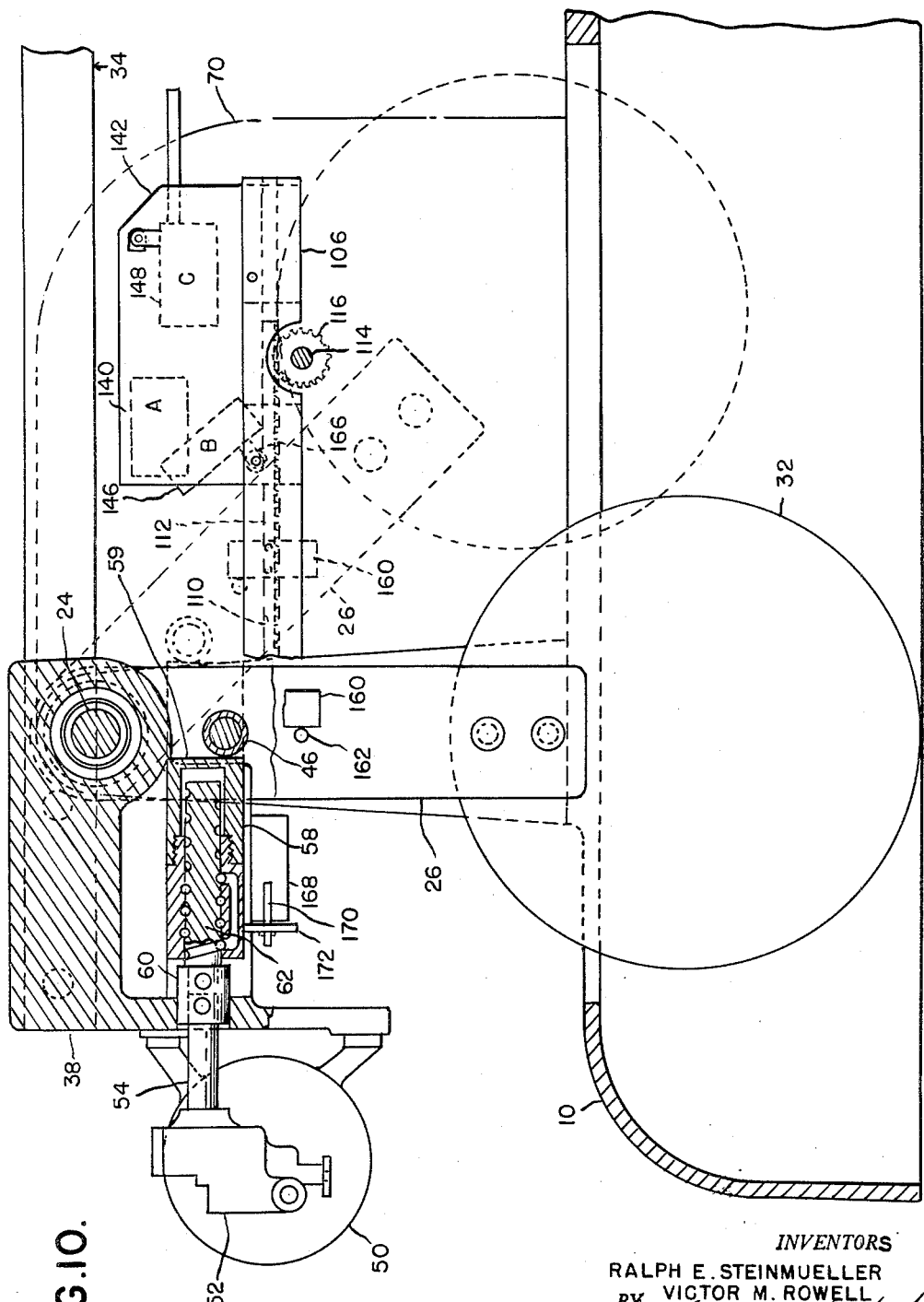

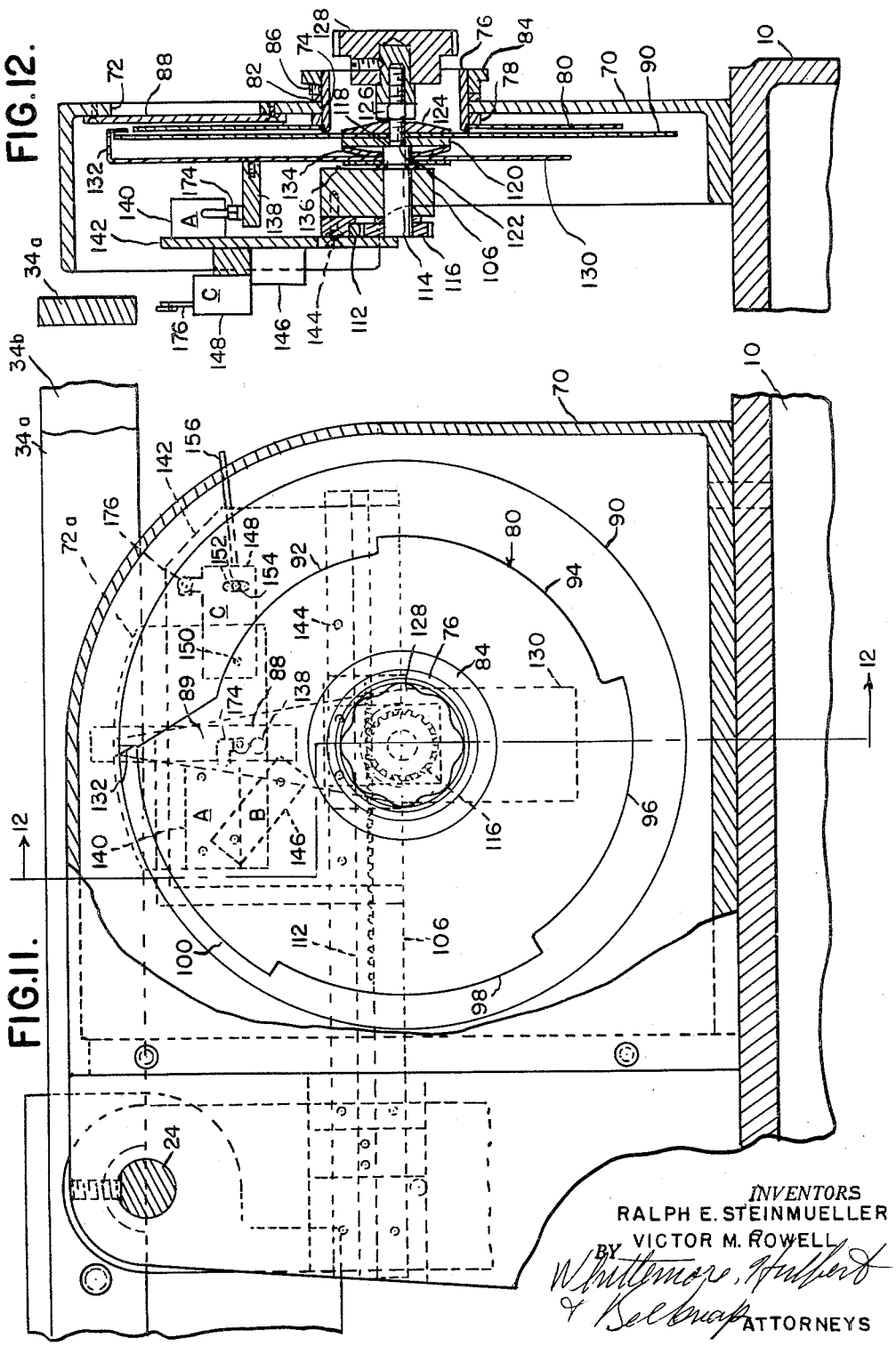

Aug. 28, 1962   R. E. STEINMUELLER ET AL   3,050,992
UNIVERSAL STRENGTH TESTING MACHINE

Filed Feb. 24, 1959   7 Sheets-Sheet 7

INVENTORS
RALPH E. STEINMUELLER
VICTOR M. ROWELL
ATTORNEYS

United States Patent Office
3,050,992
Patented Aug. 28, 1962

3,050,992
UNIVERSAL STRENGTH TESTING MACHINE
Ralph E. Steinmueller, Detroit, and Victor M. Rowell, Dearborn, Mich., assignors to Harry W. Dietert Co., Detroit, Mich., a corporation of Michigan
Filed Feb. 24, 1959, Ser. No. 795,027
27 Claims. (Cl. 73—93)

The present invention relates to a universal strength testing machine.

The machine has been developed for the purpose of performing different tests on different types of specimens of foundry sand.

In foundry practice foundry sand is compounded and mixed to produce certain desirable physical properties. It is necessary to perform physical tests on the foundry sand to determine the correctness of a particular mix. The tests most commonly employed are green strength and deformation, shear strength, and tensile strength of a particular shaped baked specimen.

It is an object of the present invention to provide a simple apparatus for subjecting specimens of foundry sand to the required forces either compression, shear stress or tension, and to measure and/or record the results of the tests.

It is a further object of the present invention to provide strength testing apparatus including a pivoted beam, a pendulum weight suspended from said beam, means for swinging said pendulum weight to different angular positions and for connecting said weight to said beam in all of said positions to apply to said beam a torque dependent upon the angular displacement of said pendulum weight.

It is a further object of the present invention to provide, in testing apparatus of the character described above, motor means carried by the beam and drive means connecting the motor and weight to establish different displaced positions of the pendulum weight relative to the beam.

It is a further object of the present invention to provide a beam, a pendulum weight connected to the beam and adapted to be displaced relative thereto to apply variable torque to the beam, indicating means including a relatively rotatable pointer and dial, and means for effecting angular displacement between said pointer and dial in accordance with horizontal displacement of the center of gravity of said pendulum weight from the vertical plane containing its axis.

More specifically, it is a feature of the present invention to provide a pivoted beam, a pendulum weight suspended from said beam about the pivot axis thereof, motor means carried by said beam and connected to said pendulum weight for rocking said pendulum weight, a driving element on said pendulum weight, a horizontally disposed rack having a head thereon provided with a vertical surface engageable by said driving element, a pinion engaged by said rack, indicating means including relatively rotatable dial and pointer members, and a pinion fixed to said one of said members and in mesh with said rack.

It is a further object of the present invention to provide strength testing apparatus comprising a first pivoted beam, means for applying a variable torque to said beam, a second pivoted beam having its axis parallel to but spaced laterally from said first beam, and adjustable coupling means for connecting said beams to vary the torque applied to said second beam.

It is a further object of the present invention to provide a pivoted beam, a pendulum pivoted to said beam, a motor carried by said beam and connected to said pendulum, indicating mechanism for indicating displacement of said pendulum by said motor, a motor control switch and an adjustable switch operator connected to said indicator to stop said motor upon attainment of a selected torque.

It is a further object of the present invention to provide structure as described in the preceding paragraph in which said switch is operable to effect reverse movement of said motor.

It is a feature of the present invention to provide a primary beam comprising a pair of laterally spaced parallel beam portions pivoted adjacent one end thereof, a pendulum depending from pivot mounting means for said primary beam, a motor carried by said primary beam, a driving connection between said motor and said pendulum, a secondary beam disposed between the laterally spaced beam portions of said primary beam, and adjustable coupling means for coupling said primary beam and said secondary beam together to vary the torque applied to said secondary beam.

It is a further feature of the present invention to provide testing apparatus comprising a frame, a beam pivoted to said frame, a specimen engaging element on said beam movable toward and away from said frame, an indicator on said frame, motion transfer means interposed between said beam and indicator and including a member movable between operative and inoperative positions, and means responsive to predetermined yielding of a specimen disposed between said frame and beam to shift said member to inoperative position.

Other objects and features of the invention will become apparent as the description proceeds, especially when taken in conjunction with the accompanying drawings, illustrating preferred embodiments of the invention, wherein:

FIGURE 1 is a side elevation of the universal strength testing apparatus.

FIGURE 2 is a plan view thereof.

FIGURE 3 is an enlarged sectional view on the line 3—3, FIGURE 1.

FIGURE 5 is an enlarged sectional view on the line 5—5, FIGURE 1.

FIGURE 6 is an enlarged sectional view on the line 6—6, FIGURE 1.

FIGURE 7 is an enlarged sectional view on the line 7—7, FIGURE 1.

FIGURE 9 is an enlarged fragmentary sectional view of the test head employed in FIGURE 8.

FIGURE 10 is an enlarged side elevational view with parts in section, showing the connection between the primary beam and pendulum.

FIGURE 11 is an enlarged side elevational view of a portion of the frame with parts removed and parts in section, showing the connection between the pendulum actuating mechanism and the indicator mechanism.

FIGURE 12 is a sectional view on the line 12—12, FIGURE 11.

FIGURE 15 is a bottom plan view of a head for testing shear strength of a specimen.

FIGURE 16 is a side elevational view of the head shown in FIGURE 15.

Figure 4:
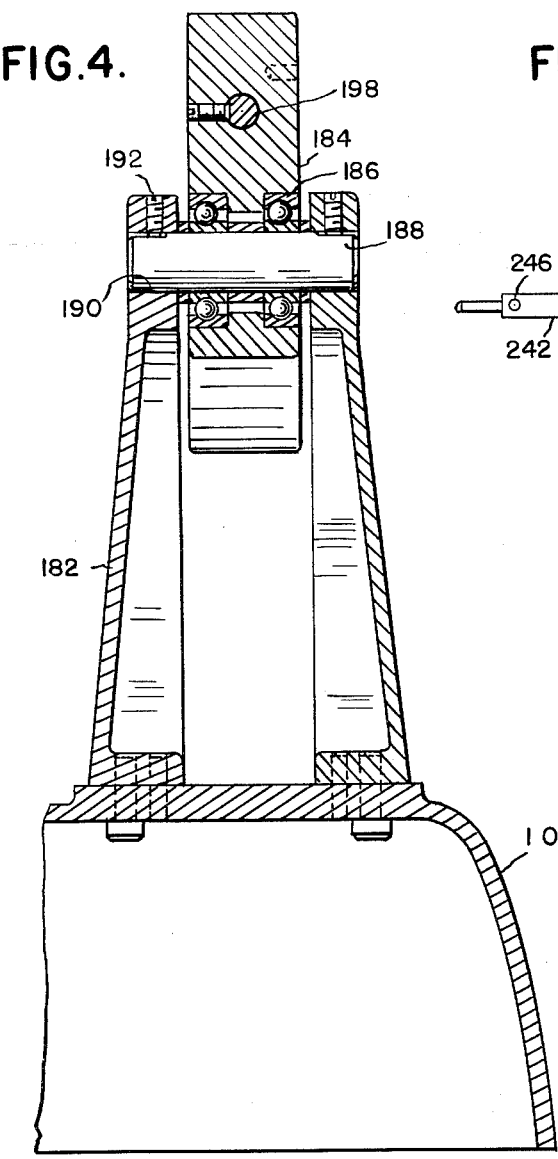
FIGURE 4 is an enlarged sectional view on the line 4—4, FIGURE 1.

The strength testing apparatus comprises a frame including an elongated hollow base 10 having an elongated opening 12 in the top wall 14 thereof. At opposite sides of the elongated opening 12 are fixedly mounted a pair of pedestals 16 and 17. The upper ends of the pedestals 16 and 17 are provided with apertured heads 18 provided with set screws 20 adapted to engage flats 22 provided on a cylindrical shaft 24. As best seen in FIGURE 3, it will be observed that the shaft 24 thus interconnects the upper ends of the pedestals 16 and 17. In addition, the shaft 24 constitutes a pivot support for a pendulum weight structure comprising a pair of arms 26 supported by bearings 28 on the shaft 24. At their lower ends, the arms 26 are rigidly connected as by screws 30 to a relatively large cylindrical weight 32. In a practical embodiment of the present invention the weight 32 is a 50-lb. weight.

A primary beam is provided which is mounted for angular movement in a vertical plane about the axis of the shaft 24. The primary beam designated as a whole at 34 in FIGURE 1 comprises a pair of parallel laterally spaced beam portions 34a and 34b which are notched as indicated at 36 to accommodate the shaft 24. The beam portions 34a and 34b are fixedly secured to a motor support bracket 38 by suitable fastening means such as indicated diagrammatically at 40. The bracket 38 is mounted by bearings 42 for rotation on the fixed shaft 24.

Extending between the pendulum arms 26 is a cross pin 44 having a rotatable elongated sleeve 46 thereon. The motor support bracket 38 includes a depending and laterally offset portion 48 to which is mounted a motor 50 connected through suitable reduction gearing contained in a gear reduction housing 52 to a drive shaft 54.

Longitudinally slidable in a substantially parallel-sided opening 56 in the bracket 38 (as best seen in FIGURE 3) is a pendulum actuating nut 58 details of which are best seen in FIGURE 10. The shaft 54 is connected by coupling means 60 to a threaded shaft 62 received in the nut 58. Since the nut is retained against rotation, rotation of the threaded shaft 62 results in movement of the nut 58 to the right or left as seen in FIGURE 10, depending upon the direction of rotation thereof. Preferably, and as indicated in FIGURE 10, the nut and threaded shaft 62 are of the captive ball type to reduce friction.

Referring again to FIGURE 10 it will be observed that the end surface 59 of the nut 58 occupies a vertical plane and has a substantial vertical extent adapted to contact the rotatable sleeve 46. Accordingly, lateral displacement of the pendulum weight 32 is a direct linear function of the movement of the nut 58. In other words, a predetermined increment of movement of the nut from the position shown in full lines will result in a definite movement of the weight to the right from the vertical plane passing through the axis of the shaft 24. When the weight 32 reaches the position shown in dotted lines, movement of the nut 58 by an identical increment will result in displacement of the weight 32 through a much greater arc to produce the same horizontal displacement. The torque applied to the beam 34 by the weight 32 is determined by the product of the weight times the horizontal displacement of its center of mass from the vertical plane passing through the axis of the pivot shaft 24. Accordingly, uniform increments of motion of the nut 58 throughout its entire range of movement result in change in torque applied by the weight in correspondingly uniform increments. This is an important feature of the present invention since it is useful in providing a uniform division indicator dial showing force applied by the strength testing apparatus as will subsequently appear.

Referring now more particularly to FIGURES 10-13 there is shown the indicating mechanism together with certain motor controls as will now be described.

Mounted on the base 10 is a dial enclosure 70 having a view opening 72 the shape of which is best seen in FIGURE 1, and a circular mounting opening 74. Received within the mounting opening 74 is a sleeve 76 having an abutment ring 78 and a mask 80 fixedly secured thereto. A friction washer 82 is interposed between the outer surface of the dial housing 70 and the manipulating ring 84 which is secured to the sleeve 76 by a set screw 86 so as to interpose a frictional resistance to turning of the mask 80.

The view opening 72 is provided with a transparent strip 88 which has a vertical reference line 89.

The mask 80 overlies a rotatable indicating dial 90 which has a plurality of different circumferentially arranged indicia to provide a plurality of scales, depending upon a particular adjustment of the apparatus. The shape of the mask 80 is best seen in FIGURE 11 where it will be observed that it is provided with five circularly shaped and radially and circumferentially spaced edges 92, 94, 96, 98 and 100. It will be apparent that by rotating the mask 80 to any one of the five different positions, from one to five indicating scales will be exposed on the dial in the view opening 72 whose position is shown at 72a in dotted lines in FIGURE 11. The particular scale in use of course is the one most closely adjacent to the mask surfaces 92, 94, 96, 98 or 100. Obviously of course, the mask could be arranged with circumferentially extending slots to expose only one of the dial scales at a time.

The pedestal or post 16 is provided with an inwardly extending boss 102 provided with an elongated recess 104 which receives one end of a dial mounting arm 106, the arm being rigidly retained in position in the boss 102 by screws 108. The arm 106 is elongated as best seen in FIGURE 10 and is provided with an elongated slot or groove 110 for receiving an elongated rack 112. The arm 106 extends within the dial housing 70 and in alignment with the opening 74 in the dial housing it is provided with a cross shaft 114 carrying a pinion 116 which is in mesh with the rack 112. The shaft 114 is provided with a shoulder 118 against which bears a clutch disc 120 having a transverse groove 122 shaped to receive a transversely extending key formed on the shaft 114. Thus, the clutch disc 120 is retained against rotation relative to the rotatable shaft 114. The dial 90 engages the outer surface of the clutch disc 120 and is clamped against the clutch disc by a retainer 124 the latter being clamped in assembled relation by a nut 126. A resetting knob 128 is fixed to the shaft 114 by a set screw.

Located behind the dial 90 is an arm 130 the upper end portion of which extends forwardly across the upper edge of the dial 90 and downwardly thereover to provide a pointer 132 for registration with suitable indicia on the dial. The arm 130 is retained between a friction washer 134 and a rigid washer 136 so that while it normally turns with the shaft 114, it may be moved to different adjusted positions by holding the knob 128 stationary while reaching through the opening 72 and moving the pointer arm 130 manually to adjusted position.

Extending rearwardly from an upper portion of the arm 130 is a switch actuating finger 138 adapted to cooperate with a micro switch 140 carried by a switch mounting plate 142 which is secured to the arm 106 by suitable means such as screws 144. Also carried by the mounting plate 142 are additional microswitches 146 and 148 the purpose of which will presently be described. It is noted however, that the switch 148 is mounted for swinging movement about a pivot 150, this movement being permitted by an arcuate slot 152 provided in the mounting plate 142 and receiving fastening element 154 extending through the slot. The switch 148 is also provided with an arm 156 extending laterally therefrom, as best seen in FIGURE 11.

The rack 112 is provided at its left hand end as seen in FIGURE 10, with a head 160 engaged by a pin 162 carried by one of the weight supporting arms 26. The head 160 has a vertically extending surface engageable by the pin 62 so as the pendulum weight 32 is swung to the right, the rack 112 is moved to the right by an amount directly proportional to the horizontal displacement of the center of mass of the pendulum weight from the vertical plane passing through the axis of the pivot shaft 24. With this arrangement uniform increments of movement of the actuating nut 58 result in uniform increments of rectilinear displacement (not arcuate movement) of the center of gravity of the pendulum weight 32, and also uniform increments of movement of the rack 112. This movement of the rack 112 through its meshed engagement with the pinion 116 results in similar uniform increments of rotation of the shaft 114. Therefore, indicia on the dial 90 showing uniform increments of torque will have uniform circumferential spacing.

It will be observed that actuation of the dial through the rack is a one-way operation so that the dial 90 and arm 130 remain at the furthest position of displacement when the weight 32 is returned to its position below the shaft 24. There is thus provided an indication of the greatest loading or torque applied by the pendulum weight in each particular testing operation. The dial and pointer may be reset to the zero position by rotation of the knob 128. It of course will be recalled that the pointer 132 of the arm 130 may be adjusted independently of the dial.

The testing apparatus is designed to perform different tests on specimens of foundry sand by effecting adjustment of force applying structure later to be described. However, in all cases the loading is applied by actuation of the motor 50 which operates to swing the pendulum weight 32 out of the vertical plane and hence, to apply a torque to the primary beam 34. When a predetermined load has been applied or when the specimen fails or yields a predetermined amount, switch means are provided for reversing the motor to lower the pendulum weight gradually to its inoperative position and when it reaches that position to de-energize the motor.

Reference is now made to FIGURES 10–12 which show the several switches. The switch 146 is mounted on the bracket 142 in a position such that its actuator 166 is engageable by one of the pendulum weight arms 26 to limit swinging movement of the pendulum. The position of the switch 146 is preferably such that approximately 45 degrees swinging movement is permitted the pendulum from its position directly beneath the axis of the pivot shaft 24 to its extreme load applying position. If no other control has responded, actuation of the reversing switch 146 by the arm 26 will reverse the motor and cause the pendulum weight to be lowered gradually to its idle position. Suitably connected to the motor 50 is a stop switch 168 having a movable switch actuating blade 170 engageable by a pin 172 extending downwardly from the nut assembly 58. With the parts in the position shown the pin 172 has actuated the switch 168 to stop the motor 50.

The switch 140, as best seen in FIGURE 12, includes an actuator 174 engageable by the finger 138 extending to the left from the arm 130, as seen in FIGURE 12, as the arm 130 passes the vertical position best illustrated in FIGURE 11. By setting the arm 130, deformation at a predetermined load may be determined by mechanism which will subsequently be described. At the time the pointer 132 reaches the gauge mark 89 on the transparent strip 88 connection to a recording indicator is broken. If it is desired to test the specimen to rupture the pointer 132 is initially moved to the extreme left so that during increasing load applied to the apparatus, it will never be caused to traverse the vertical centerline.

The switch 148, as previously described, is mounted for adjustment and includes an upwardly extending actuator 176. The switch may be moved to desired position by the projection or arm 156 where it is retained frictionally. The switch actuator 176 is positioned beneath the beam portion 34a. In FIGURES 11 and 12 the beam portion 34a is shown in its normal position which it occupies when the weight 32 is in its idle position with its center of gravity directly beneath the pivot shaft 24. However, the beam 34 is permitted to swing clockwise beyond the idle position shown in FIGURE 1 to a position in which its free end engages a rubber bumper 178 carried at the top of a lug 180 which is formed on a pedestal member 182. The switch actuator 176 is in a position such that when the beam 34 swings clockwise from the position shown in FIGURE 1, a portion of one of the beam arms will actuate the switch 148 and reverse the motor 50.

Swinging movement of the weight 32 as so far described provides a controllable force tending to swing the primary beam 34 clockwise from the position shown in FIGURE 1, and for certain tests force may be applied to a specimen directly from the primary beam. However, in accordance with the present invention a secondary or high load beam is provided which is actuated by the primary or low load beam to produce a controlled multiplication of force.

The high load or secondary beam indicated generally at 184 is mounted as best illustrated in FIGURE 4, on bearings 186 from a pivot shaft 188 which is supported in openings 190 in the pedestals 182. The shaft 188 is fixedly retained in the openings 190 by set screws 192. The secondary beam 184 includes a portion 194 extending to the right of the pivot shaft 188, as seen in FIGURE 1, and which is hollow to receive a poured lead counterbalance weight 196 to counterbalance the weight of the portion of the secondary beam 184 extending to the left of the shaft 188. Various changes in the center of gravity of the secondary beam 184 occur due to difference in adjustment and the mounting and separation of attachments therewith. In order to exactly balance the beam 184 there is provided a rod 198 fixedly secured thereto and extending to the right of the pivot shaft 188 as seen in FIGURE 1. Adjustable on the rod 198 is a weight 200 which may be moved to a position exactly balancing the beam and there locked in position by a set screw 202.

As previously stated, means are provided for coupling the primary and secondary beams together at different points to provide selectively different mechanical advantages. This means comprises a plurality of vertically extending openings 204, 206 and 208 through the secondary beam. Means extending through this means couple it to the secondary beam. This means is best illustrated in detail in FIGURE 5. The coupling means comprises an elongated head 210 secured by a screw 211 to the lower end of a rod 212 the upper end of which is threaded as indicated at 214 to receive the knurled nut 216. Extending from opposite ends of the elongated head 210 are threaded mounting elements 218 having rollers 220 carried at their outer ends. A locating pin 222 extends upwardly from the head 210 into a recess provided at the underside of the secondary beam 184 adjacent to the openings 204, 206 and 208. It will be apparent that a force applied to the beam 34 through the beam portions 34a and 34b to the rollers 220 applies a similar downward force biasing the secondary beam 184 for swinging movement about the axis of its mounting shaft 188. Similarly, it will be apparent that by shifting the coupling structure including the head 210 to the three different positions determind by the openings 204, 206 and 208 in the secondary beam, more or less mechanical advantage will be obtained.

As best seen in FIGURES 1 and 6, the base 10 is provided with means for supporting a speciment S1. This means comprises movable posts 224 and 226. The secondary beam 184 is provided with a downwardly extending blade 228 adapted to engage the upper surface of the specimen S1 substantially midway between the posts 224 and 226.

Adjacent the free end of the beam 34 the separate beam portions 34a and 34b are interconnected by mechanism which does not interfere with movement of the secondary beam 184 into the space between the primary beam portions 34a and 34b. This means comprises a transverse tie bar 230 connected by screws 232 to the undersides of the primary beam portions 34a and 34b. Surrounding the screws 232 and interposed between the tie bar and the beam portions are the spacer sleeves 234.

Figure 8:
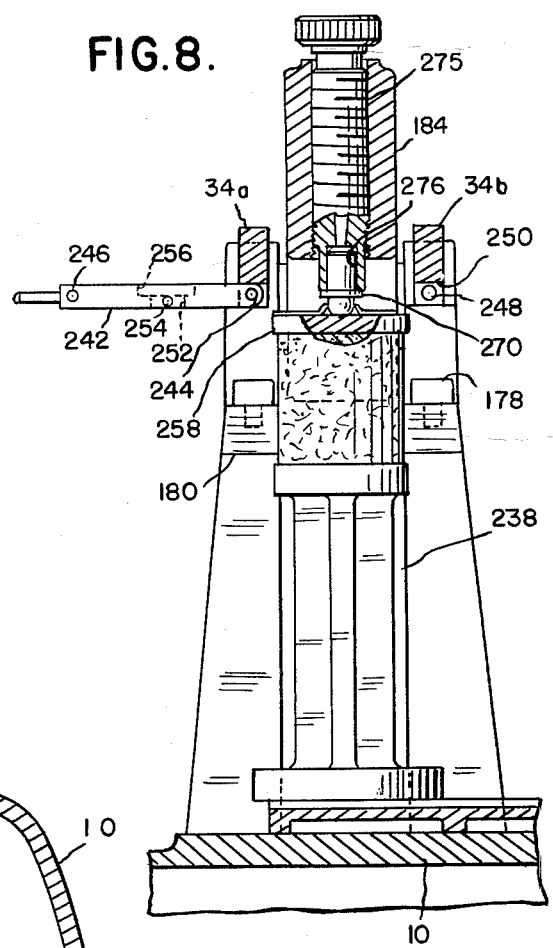
FIGURE 8 is an enlarged sectional view similar to FIGURE 7, showing the apparatus adjusted for performing a different test operation.

As best seen in FIGURES 1 and 7, adjacent the pedestals 182 there is provided a support pad 236. The upper surface of the pad 236 is corrugated as best seen in FIGURE 1, and supports a removable specimen mounting post 238 the upper end of which is provided with a cylindrical head 240 for receiving a specimen S2. Means are provided for applying pressure to the upper end of the specimen S2 and this means is best illustrated in detail in FIGURES 7–9. As seen in FIGURES 7 and 8, the primary beam portion 34a carries a cross bar 242 for swinging about horizontal pivot 244. The free end of the cross bar 242 includes releasable engaging means indicated at 246. The releasable means may be in the form of a spring pressed detent 248 carried in a bar receiving slot 250 provided at the underside of the primary beam portion 34b. The cross bar 242 is provided with a through opening 252 having a releasable detent 254 and an enlarged seat portion 256 at one side thereof, all as best illustrated in FIGURE 8. With the parts in operative position as shown in FIGURE 7, a pressure head indicated generally at 258 is provided which engages the upper end of the specimen S2. The head 258 comprises a shell 260 having an upwardly turned flange portion 262 engaging a ball head 264. The shell includes a disc 266 fixed within the shell and retained therein by pins 268. With this arrangement it will be observed that the head 258 accommodates itself to apply pressure uniformly to the upper surface of the specimen S2. The ball head 264 is formed on a force transmitting member 270 which includes a flange 272 and an upwardly extending reduced portion 274.

If force is to be applied to the specimen S2 through the primary beam 34, the cross bar 242 is placed in the position shown in FIGURE 7 and the force transmitting member 270 is positioned as shown in the opening 252 of the cross bar 242. Thus, downward force applied to the primary beam 34 applies pressure to the cross bar 242 and from the cross bar to the flange 272 of the force transmitting member.

If on the other hand, it is desired to apply a greater compressive force to the specimen S2 the primary and secondary beams are coupled together at the appropriate point so that the force will be applied to the specimen from the secondary beam 184. This arrangement is best illustrated in FIGURE 9. The secondary beam 184 has a pressure applying screw 275 which in FIGURE 7 is shown as retracted upwardly to an inoperative position. To adjust to the operating condition illustrated in FIGURES 8 and 9 the cross bar 242 is disengaged from the detent 248 and is swung out of operating position as shown in FIGURE 8. The screw 275 is moved downwardly so that the reduced upper end 274 of the force transmitting member 270 is received within a recess 276. Thus, force is transmitted from the secondary beam 184 through the screw 275 directly to the force transmitting member 270.

Instead of the compression head 258 a special head 277 for testing shear strength may be substituted. This head is illustrated in FIGURES 15 and 16 and comprises essentially a cylindrical body one-half of an end surface thereof being cut away as indicated at 278. The shear head is held rigid. It has a head 277 and shank 279 which fits into a recess in the end of screw 275. A locating pin, entering opening 279a, keeps the shank head in position.

Figure 13:
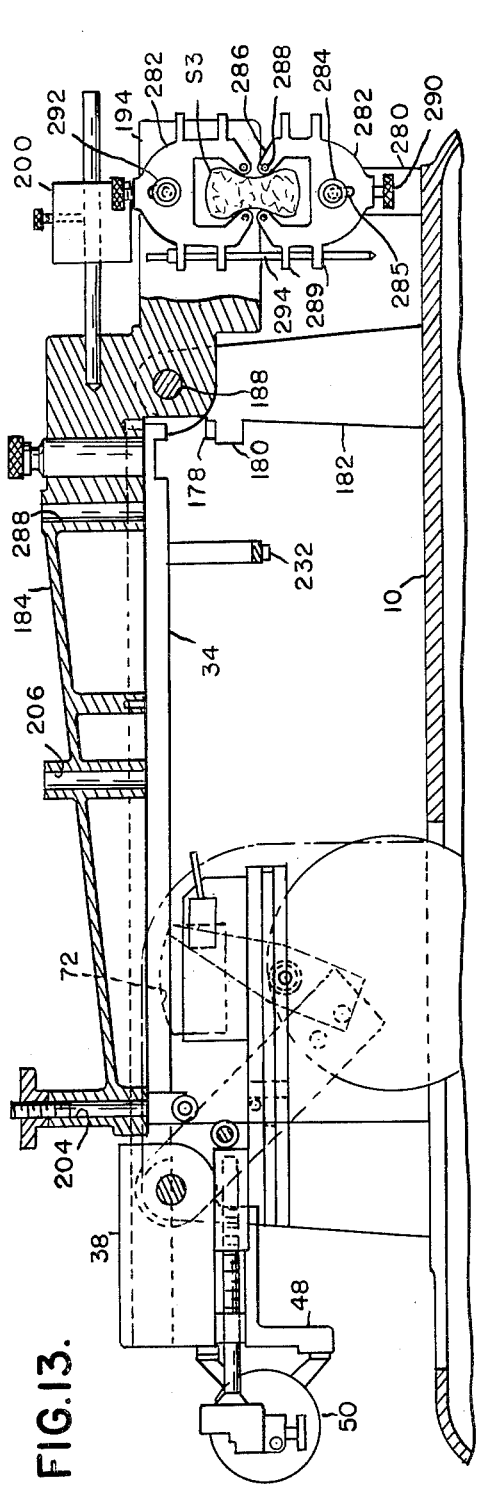
FIGURE 13 is a side elevational view of the machine with parts in section, showing apparatus connected for performing a test of tensile strength of a specimen.

Among the tests which are used in testing foundry sand is a test of the tensile strength of a specimen which is performed with the present apparatus and attachments thereto as illustrated in FIGURE 13. As shown here, for performing this test a removable post 280 is provided on the portion of the base 10 extending to the right of the pedestals 182. An adaptor 282 is secured to the post 280 by a transversely extending mounting pin 284 which extends through an elongated opening 285 in the adaptor 282. The adaptor 282 is provided with a pair of rigid jaw elememts 286 provided with specimen engaging rollers, the pivot mountings of which are indicated at 288. Extending from one side of the adaptor 282 are a pair of ears 289 having aligned apertures therein for a purpose which will presently appear.

The adaptor 282 is provided with a screw 290 which may be adjusted into engagement with the pivot pin 284 so as to take up lost motion between the specimen S3 and the adaptors before any movement of the secondary beam 184.

An identical adaptor 282 is provided on the projecting portion 194 of the secondary beam 184 and is secured thereto by a pivot mounting pin 292.

An elongated guide pin 294 is provided which extends through the aligned openings in the ears 289 to control the position of the adaptors 282. Obviously, force applied to the secondary beam 184 tending to rotate it in a counterclockwise direction about the pivot shaft 188 tends to separate the adaptors 282. The test specimen S3 is provided with enlarged end portions engageable by the rollers carried by the pivot pins 288. The application of force is increased gradually until the specimen ruptures.

Reference was previously made to the adjustable weight 200 and it will be appreciated that when the upper adaptor 282 is connected to the secondary beam 184, a condition of unbalance results which can be corrected by appropriate adjustment of the weight 200.

Figure 14:
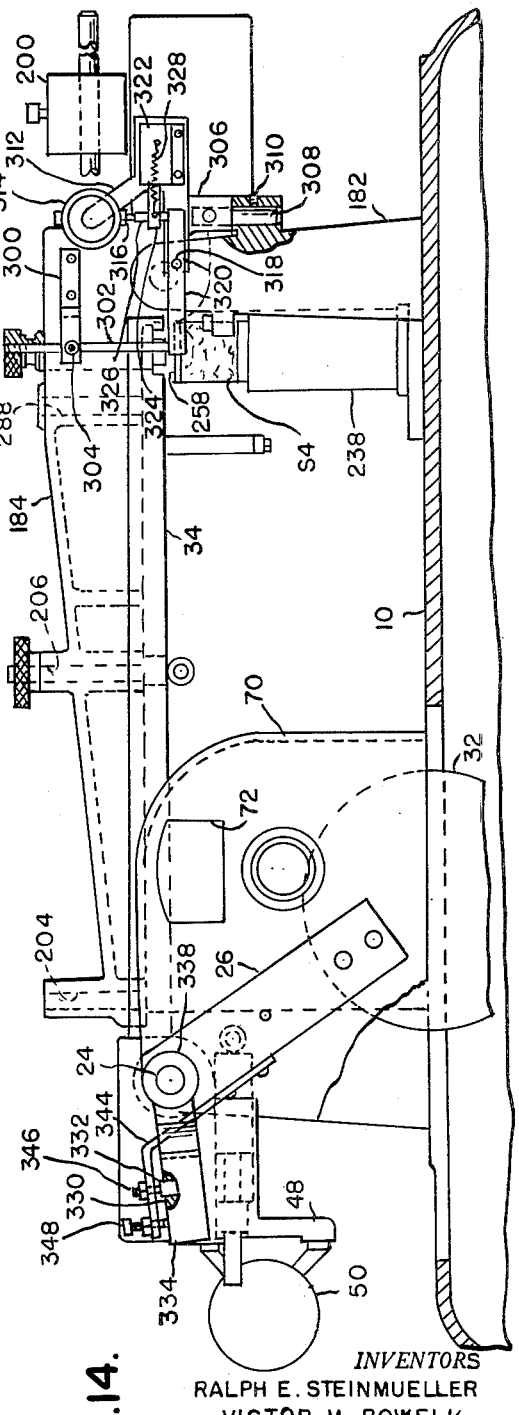
FIGURE 14 is a side elevation of the apparatus with parts broken away, showing parts adjusted, and associated mechanism for performing a test of green deformation of a specimen.

Reference is now made to FIGURE 14 for a description of yet another test to be performed upon a test specimen S4. This particular test is referred to as a green deformation test and its purpose is to determine the deformation before rupture or yielding under load of a green or unbaked sand specimen of predetermined dimensions. The basic apparatus employed for this test is the same as previously described but the test is carried out with the pair of attachments applied to the structure. These attachments are for the most part illustrated in FIGURE 14 but reference is also made to FIGURE 3. The specimen S4 may be supported upon the post 238 previously referred to or a similar post, and is provided at its upper end with the pressure head 258. The pressure head 258 is connected as shown in FIGURE 9 to the secondary beam 184. Secured by a bracket 300 to the secondary beam 184 is an actuating pin 302 adapted to be clamped in adjusted operating position by a set screw indicated at 304. A removable green deformation test support bracket 306 is mounted on the pedestal 182, the connection being by a downwardly extending pin 308 engaged by a set screw 310. Mounted on the bracket 306 is an arm 312 carrying a dial indicator 314 of the type adapted to indicate movement and to cause its pointer to remain in the furthest position of displacement. The indicator 314 is actuated by a plunger 316. Mounted for swinging movement on a pin 318 on the bracket 306 is a lever 320 adapted to be engaged at its left hand end by the lower end of the pin 302. The right hand end of the lever 320 is located directly beneath but spaced substantially from the lower end of the operating plunger 316 of the dial indicator.

A solenoid 322 is provided having an armature therein connected to a rod 324 carrying a cross pin 326. In the position shown in FIGURE 14 the cross pin 326 is engaged between the right hand end of the lever 320 and the lower end of the indicator plunger 316. The position shown corresponds to energized position of the solenoid 322. When the solenoid is deenergized a tension spring diagrammatically illustrated at 328 retracts the armature and moves the pin 324 out of operating position. At this time the lever 320 rotates counterclockwise by gravity and the pointer of the dial indicator remains in the position which it occupied when the solenoid 322 was de-energized.

The means for controlling energization of the solenoid 322 comprises a micro switch 330 having an actuating plunger 332. The micro switch 330 is mounted on an arm 334 carried by an extending portion of the pivot shaft 24. The arangement is best illustrated in FIGURE 3 where there is shown a friction washer 336 engageable between an apertured end of the arm 334 and the outer surface of the pedestal 16. Fixedly connected to the apertured end portion of the arm 334 is a knurled knob 338. The assembly is completed by a clamping collar 340 provided with a set screw 342 to retain the parts in the position shown. In assembly the collar is pressed inwardly to establish susbtantial friction by the friction washer 336 and is then locked in position by the set screw.

Secured to a side of one of the weight supporting arms 26 is a bracket 344. The bracket 344 includes an adjustable switch actuating screw 346 and a set screw 348 designed to prevent injury to the delicate micro switch mechanism.

If it is assumed that the mechanism illustrated in FIGURE 14 were in an initial position in which the weight 32 is centered directly beneath the axis of the pivot shaft 24, the knob 338 may be rotated clockwise to shift the arm 334 to a position determined by its engagement with the set screw 348. In this position the switch actuating screw 346 is in position to actuate the switch plunger 332. If the motor 50 is now energized to swing the weight 32 counterclockwise the bracket 344, through the screw 348, will cause the arm 334 to rotate about the extension of the shaft 24. This motion is permitted since the assembly of the arm, as previously described, constitutes a frictional mounting. As load applied by the weight 32 to the specimen S4 increases the specimen eventually commences to yield. Under some conditions the rate of yielding prior to failure of the specimen S4 increases until a point may be reached at which the yielding of the specimen permits clockwise rotation of the primary beam 34 at a rate greater than the counterclockwise rotation of the pendulum weight 32. When this condition prevails, even though the motor 50 continues to operate in its forward direction, there will be an actual retrograde or counterclockwise movement of the weight 32 and weight supporting arms 26. When this occurs, the switch actuating screw 346 will move away from the switch plunger 332, thus deenergizing the solenoid 322 which withdraws the pin 326 from operating connection to the indicator 314. If it is desired to determine the amount of deformation at a load less than the yield load, the pointer 132 is set at the selected load, as previously described. When this load is reached, the micro-switch 140 will deenergize the solenoid 322. The indicator will stop registering but the compression test will continue until the specimen breaks.

Referring again to FIGURE 1 there are shown attachments for the apparatus for performing yet another test. This test is a green tensile test on a specimen S5. The lower end of the specimen S5 is gripped in a support structure 350. Its upper end is similarly gripped in a support head 352. The head 352 is connected by a link 354 to a pivot pin 356 carried by the secondary beam 184. Obviously, counterclockwise torque applied to the secondary beam 184 applies a lifting force to the link 354 subjecting the test specimen S5 to tension.

The foregoing detailed description is believed to make the overall operation of the universal strength testing apparatus readily understandable. However, the operation will be briefly reviewed in general terms.

For low loads the primary light load double arm beam is used direct while for heavier loads the high load beam is used simply by attaching a roller stud in different positions so that the rollers which are connected to the high load secondary beam will be acted upon by the light load primary beam to gain mechanical advantage. Three positions are provided for the roller stud to cover all the ranges necessary for the individual tests.

It is to be understood that the tests performed by the apparatus are in general tests which have been approved by the American Foundrymen's Society which sets forth the specifications as to dimensions and pre-treatment of the various test specimens. Accordingly, the present machine is dimensioned to carry out tests in full accordance with the specifications formulated by the Society.

The load is applied by means of a motor driven ball bearing screw which, in a straight line motion, pushes against a roller fastened to the weight carrying arm. The weight of approximately 50 pounds will move from its vertical position to a 45-degree position. This arrangement results in a uniform rate of loading throughout the range, assuming a uniform rate of advance of the ball bearing screw.

A friction tight gear rack pushed by a pin on the weight carrying arm, rotates a dial carrying the scales for the individual tests. The foregoing structure permits scales whose divisions are all uniformly spaced. The scale remains in its maximum reading position following each test and is then manually brought back to zero for the next test.

The dimensions of the apparatus are such that compression ranges applied to a two inch diameter specimen on the post 238 are from 0 to 5 pounds per square inch, 0 to 50 pounds per square inch, and 0 to 500 pounds per square inch, according to the adjustment of the apparatus. The specimen to be tested is prepared by ramming in a cylindrical mold and is then stripped from the mold onto the post 238. Where the specimen is to be subjected to a test within the 0 to 5 pounds per square inch range the light load or primary beam 34 is used direct. The compression head 258 is removed from the compression screw 275 in the high load beam and is placed on the cross bar 242.

When the specimen is to be subjected to compressive forces within the 0 to 50 pounds per square inch range the cross bar 242 is swung out of the way, the compression head 258 is connected directly to the screw 275 as shown in FIGURE 9, and the primary and secondary beams are interconnected at the center opening 206.

When the specimen is to be subjected to pressure within the 0 to 500 pounds per square inch range, the compression head remains in the screw 275 as before, but the connecting roller head 210 is associated with the opening 204 in the secondary beam 184.

The same three ranges will of course be available for the shear test on a specimen having a diameter of two inches and a length of two inches. In this case a special post (not shown) and head 277, similar to the compression head 258, is provided, the head 277 being adapted to fit into a recess in screw 257. The end of the special post is shaped similarly to shear head 277, except turned 180 degrees therefrom to apply shear stress to the specimen. In this case the ranges will be from 0 to 4 pounds per square inch, 0 to 40 pounds per square inch, and 0 to 400 pounds per square inch.

The tensile test of a core performed by use of the adaptors 282 has a normal range of from 0 to 600 pounds. In this case the connection between the beams will be at the opening 204.

The tensile strength test performed between the specimen engaging members 350 and 352, as seen in FIGURE 1, has a range of from 0 to 64 ounces per square inch for a two-inch diameter specimen. The standard two-piece tensile tube engaging the ends of the specimen is employed. In this case the interconnection between the beams will be at the opening 208 most closely adjacent to the pivot shaft 188.

The transverse strength or bending test performed with the specimen S1 supported on the posts 224 and 226, has a range of from 0 to 350 pounds with the blade 228 mounted in a permanent position and the interconnection between the beams at the opening 294 in the secondary beam, or 0 to 35 pounds with the interconnection at the opening 206.

A deformation indicator may be employed in conjunction with the test specimen S2, adapted to follow movement of the upper compression head as long as the load is increasing. Preferably, the indicator will be of the type including a friction pointer adapted to remain in the position occupied the instant the weight reverses as the specimen collapses; that is, when deformation becomes faster than the rate of loading. Deformation readings may be halted at any preselected load ahead of collapse by means of the pointer 132 and the microswitch 140 (FIGURE 12). This eliminates the necessity for a recorder to obtain a deformation curve.

The same accessory may be used to measure the deflection of the transverse specimen S1 at the breaking point or at any preselected load ahead of the breaking load. In this case the indicator assembly is moved into proximity to test specimen S1, where post 360 is provided for supporting the assembly.

The drawings and the foregoing specification constitute a description of the improved universal strength testing machine in such full, clear, concise and exact terms as to enable any person skilled in the art to practice the invention, the scope of which is indicated by the appended claims.

What we claim as our invention is:

1. A testing machine comprising a base, a primary beam pivoted thereto, a weight in the form of a pendulum pivotally connected to said primary beam, a motor carried by said primary beam and operatively connected to said weight to move said weight to apply variable torque to said primary beam, a secondary beam pivoted to said base, means for coupling said primary beam to said secondary beam at a selected one of a plurality of points to predetermine the range of torque applicable by said secondary beam by movement of said weight relative to said primary beam, and strength testing mechanism including means operably connected to and actuated by said secondary beam.

2. A machine as defined in claim 1 in which said secondary beam is pivoted intermediate its ends, whereby it may apply compressive and tensile stresses to specimens disposed between said secondary beam and said base.

3. A machine as defined in claim 1 which comprises an actuating member movable in a straight line along said beam and having an actuating face perpendicular to its direction of motion engaged by a portion of said pendulum.

4. A testing machine comprising a base, a beam pivoted to said base, a pendulum pivoted to said beam, a motor carried by said beam, means connecting said motor to said pendulum to swing said pendulum relative to said beam to provide an increasing torque on said beam, strength testing mechanism including means connected between said base and said beam, a switch for said motor, and means responsive to reverse movement of said pendulum relative to said base occasioned by yielding of a test specimen to actuate said switch to arrest continued forward actuation of said motor.

5. A machine as defined in claim 3 in which said switch is a reversing switch operable to initiate reverse motor operation to provide for return of said pendulum to initial position.

6. A machine as defined in claim 3 which comprises indicator means including a movable member and a one-way actuating connection between said motor and movable member to indicate the largest torque applied by said beam.

7. A machine as defined in claim 5 which comprises indicator means including a movable member, and a one-way actuating connection between said motor and movable member to indicate the largest torque applied by said beam.

8. A testing machine comprising a base, a beam pivoted to said base, a pendulum pivoted to said beam, a motor carried by said beam and connected to said pendulum to swing said pendulum relative to said beam, torque indicating mechanism comprising a shaft rotatable in timed relation to swinging movement of said pendulum and relatively movable dial and pointer elements one of which is fixed to said shaft, specimen deformation testing mechanism including said beam, a deformation indicator, a switch for terminating indicator response, an adjustable switch operator carried by said shaft effective to actuate said switch upon attainment of a selected torque by said beam, and strength testing mechanism including means operably connected to and actuated by said beam.

9. A testing machine comprising a base, a beam pivoted to said base, a pendulum pivoted to said beam, a motor carried by said beam and connected to said pendulum to swing said pendulum relative to said beam, torque indicating mechanism comprising a shaft rotatable in accordance with movement of said pendulum relative to said beam only in the direction to indicate increasing torque on said beam and relatively movable dial and pointer elements one of which is fixed to said shaft, a motor control reversing switch, deformation testing mechanism including said beam, a deformation indicator operable when disconnected to record the deformation existing upon disconnection, control means for disconnecting said deformation indicator, and a control means actuator operable when deformation of a specimen reverses movement of said pendulum relative to said base.

10. A testing machine comprising a base, a primary beam comprising a pair of laterally spaced arms, a pendulum suspended from said beam, a motor carried by said beam, moves connecting said motor to said pendulum, a secondary beam pivoted intermediate its ends to said base and having a portion extending along said primary beam, adjustable coupling means connecting said beams, and strength testing mechanism including means operably connected to said secondary beam.

11. A testing machine comprising a base, a primary beam comprising a pair of laterally spaced arms, a pendulum suspended from said beam, a motor carried by said beam, means connecting said motor to said pendulum, a secondary beam pivoted intermediate its ends to said base and having a portion extending between the arms of said primary beam, adjustable coupling means connecting said beams, and strength testing mechanism including means operably connected to said secondary beam.

12. A machine as defined in claim 11 in which said coupling means comprises a pair of elements adapted to be fixedly secured to said secondary beam in selected position and engageable with the undersides of both of the arms of said primary beam.

13. Testing apparatus comprising a frame, an indicator fixedly mounted on said frame, a support on said frame for a test specimen, a beam pivoted to said frame, a specimen engaging element on said beam movable toward and away from said support to apply compressive force to the specimen, motion transfer means interposed between said beam and indicator, said transfer means including a member movable between motion transfer and inoperative positions, and means responsive to yielding of the specimen connected to said member to move said member to inoperative position.

14. Testing apparatus comprising a frame, an indicator fixedly mounted on said frame, a support on said frame for a test specimen, a beam pivoted to said frame, a specimen engaging element on said beam movable toward and away from said support to apply compressive force to the specimen, motion transfer means interposed between said beam and indicator, said transfer means including a member movable between motion transfer and inoperative positions, and means responsive to attainment of deformation under a predetermined load on said specimen to move said member to inoperative position.

15. Beam loading mechanism comprising a beam, a fixed pivot for said beam, a pendulum including an arm pivoted to said beam, a rotary motor mounted on said beam, a pendulum actuating member movable longitudinally of said beam, means connecting said member to said motor for linear movement thereby in direct proportion to rotary movement of said motor, said member having a drive surface perpendicular to said beam, and means on said pendulum arm spaced from the pivot axis thereof engaged with said surface to effect horizontal displacement of said pendulum substantially in direct proportion to rotary movement of said motor.

16. Beam loading mechanism comprising a beam, a fixed pivot for said beam, a pendulum including an arm pivoted to said beam, a rotary motor mounted on said beam, a pendulum actuating member movable longitudinally of said beam, screw means connecting said member to said motor for linear movement thereby in direct proportion to rotary movement of said motor, said member having a drive surface perpendicular to said beam, and means on said pendulum arm spaced from the pivot axis thereof engaged with said surface to effect horizontal displacement of said pendulum substantially in direct proportion to rotary movement of said motor.

17. Beam loading mechanism comprising a fixed support, pivot means on said support, a beam pivoted to said pivot means, a pendulum including an arm pivoted to said pivot means for movement independently of said beam thereon, a motor on said beam, a pendulum actuator movable longitudinally on said beam and connected to said motor for movement thereby, said pendulum actuator having a surface thereon perpendicular to the direction of movement of said actuator, and means on said pendulum arm spaced from the pivot axis of said beam and pendulum and engaged with said surface to effect horizontal displacement of said pendulum substantially directly proportional to linear movement of said actuator.

18. Beam loading mechanism comprising a fixed support, pivot means on said support, a beam pivoted to said pivot means, a pendulum including an arm pivoted to said pivot means for movement independently of said beam thereon, a rotary motor on said beam, a pendulum actuator movable longitudinally on said beam and connected to said motor for movement thereby, the connection between said motor and actuator comprising a screw device including an element rotated by said motor in direct proportion to rotation thereof, said pendulum actuator having a surface thereon perpendicular to the direction of movement of said actuator, and means on said pendulum arm spaced from the pivot axis of said beam and pendulum and engaged with said surface to effect horizontal displacement of said pendulum substantially directly proportional to linear movement of said actuator.

19. Beam loading mechanism comprising a fixed support, pivot means on said support, a beam pivoted to said pivot means, a pendulum including an arm pivoted to said pivot means for movement independently of said beam thereon, a constant speed, rotary motor on said beam, a pendulum actuator movable longitudinally on said beam and connected to said motor for movement thereby, said pendulum actuator having a surface thereon perpendicular to the direction of movement of said actuator, and means on said pendulum arm spaced from the pivot axis of said beam and pendulum and engaged with said surface to effect horizontal displacement of said pendulum substantially directly proportional to linear movement of said actuator.

20. A testing machine comprising a base, a specimen support on said base, a beam pivoted on said base having a specimen-engaging portion movable toward and away from said support, means for causing said beam to apply an increasing load to a specimen disposed between said specimen support and said specimen-engaging portion, a recording indicator on said base, a member movably mounted on said base for movement toward and away from said indicator in accordance with deformation of a specimen on said support under load applied thereto by said beam, a motion transmitting element movable into and out of motion-transmitting position between said member and said indicator, and means responsive to attainment of a predetermined load on said specimen to shift said element out of motion-transmitting position.

21. A machine as defined in claim 20 comprising a weight movable on said beam, a motor connected between said weight and beam, said motor being operable to move said weight to increase the load on said specimen following movement of said element out of motion-transmitting position.

22. A machine comprising a base, a specimen support on said base, a beam pivoted on said base, a specimen engaging member operatively connected to said beam movable toward and away from said support, a weight movable on said beam, a motor connected between said beam and said weight to provide gradual motion of said weight relative to said beam to provide an increase in loading on a specimen, and means responsive to the rate of yielding prior to failure under load of the specimen to terminate a test cycle.

23. A machine as defined in claim 22 which comprises recording means for measuring deformation of the specimen under load, and in which the means for terminating the test cycle comprises means for terminating operation of the measuring means.

24. A machine as defined in claim 23 in which said recording measuring means comprises an indicator having means for recording the highest reading obtained during a measuring cycle, and in which the means for terminating the operation of the measuring means comprises a motion-transmitting element movable into and out of operative relationship to said indicator.

25. A testing machine comprising a base, a primary beam pivoted to said base, a weight movable along said beam, a motor connected between said beam and said weight, a secondary beam pivoted to said base in parallel relation to said primary beam, selectively operable coupling means adapted to be located at fixed positions on said primary beam to couple said beams for simultaneous swinging, indicating means comprising relatively movable pointer and dial elements, means connecting one of said elements for movement relative to the other in accordance with movement of said weight along said primary beam, a plurality of scales on said dial and manually adjustable means for designating the appropriate dial to indicate torque applied by one of said beams in accordance with the use and selected location of said coupling means.

26. A machine as defined in claim 25 comprising a switch in control of said motor, and means for effecting relative adjustment between said switch and the movable element of said indicating means to provide for actuation of said switch by said movable element at a selected torque.

27. A testing machine comprising a base, a beam pivoted to said base, a weight connected to said beam for movement longitudinally thereof to apply a variable torque to said beam, a motor connected to said weight to effect the aforesaid movement thereof, indicating means comprising relatively movable pointer and dial elements, means responsive to movement of said weight longitudinally of said beam to effect movement of one of said elements to indicate the torque applied to said beam, a first switch in control of said motor, a switch actuating member operatively associated with said first switch movable with the movable one of said elements to terminate motor operation upon attainment of a predetermined torque, said member being adjustable relative to said dial element to provide for setting of said member for switch operation at a predetermined torque, a second switch in control of said motor, adjustable means responsive to movement of said beam to actuate said second switch upon predetermined movement thereof irrespective of the torque applied thereto, said torque responsive switch actuating member being adjustable to torque values such that motor operation is controlled by the means responsive to beam movement.

References Cited in the file of this patent

UNITED STATES PATENTS

| | | |
|---|---|---|
| 2,030,457 | Lewis | Feb. 11, 1936 |
| 2,354,562 | Webb | July 25, 1944 |
| 2,502,009 | Huyser | Mar. 28, 1950 |
| 2,620,657 | Stovall | Dec. 9, 1952 |
| 2,645,935 | Pramuk et al. | July 21, 1953 |
| 2,768,823 | Lindars | Oct. 20, 1956 |

FOREIGN PATENTS

| | | |
|---|---|---|
| 613,930 | Germany | May 29, 1935 |